US008256588B2

(12) United States Patent
Mori

(10) Patent No.: US 8,256,588 B2
(45) Date of Patent: Sep. 4, 2012

(54) HYDRAULIC SHOCK ABSORBER

(75) Inventor: Yotaro Mori, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 407 days.

(21) Appl. No.: 12/701,273

(22) Filed: Feb. 5, 2010

(65) Prior Publication Data

US 2010/0219569 A1    Sep. 2, 2010

(30) Foreign Application Priority Data

Feb. 27, 2009 (JP) ................................. 2009-046992

(51) Int. Cl.
  *F16F 9/50* (2006.01)
(52) U.S. Cl. ........................................ 188/298; 280/276
(58) Field of Classification Search .................. 188/298, 188/313–317; 267/64.19, 64.23, 64.27; 280/275, 280/276
See application file for complete search history.

(56) References Cited

U.S. PATENT DOCUMENTS

2010/0044975 A1 *   2/2010   Yablon et al. ............... 280/5.503

FOREIGN PATENT DOCUMENTS

JP          11-280826        10/1999

* cited by examiner

*Primary Examiner* — Christopher Schwartz
(74) *Attorney, Agent, or Firm* — Carrier Blackman & Associates, P.C.; William D. Blackman; Joseph P. Carrier

(57) ABSTRACT

A hydraulic shock absorber includes a damper cylinder having a hollow bore therein. A piston rod and piston separate the bore into a rod side oil chamber and a piston side oil chamber. A pressure side damping force generator is provided with a sub piston in the piston side oil chamber. A first separator is provided in a sub piston side oil chamber of the sub piston, with a communication hole that communicates between the sub piston side oil chamber and a bladder side oil chamber. A hollow bladder is mounted in the bladder side oil chamber. A blow hole is provided in the bladder side oil chamber, the blow hole being normally closed by the bladder and opening when oil enters the bladder side oil chamber such that the bladder is contracted by an oil pressure when a volume of the oil reaches a predetermined capacity.

16 Claims, 8 Drawing Sheets

HYDRAULIC SHOCK ABSORBER

CROSS-REFERENCE TO RELATED APPLICATIONS

The present invention claims priority under 35 USC §119 based on Japanese patent application No. 2009-046992 filed 27 Feb. 2009. The subject matter of this priority document is incorporated by reference herein.

FIELD OF THE INVENTION

The present invention relates to a hydraulic shock absorber for placement on a saddle-type vehicle in an area such as a front fork or the like, which is interposed between the vehicle body and wheel of the vehicle for absorbing a shock from a road surface.

DESCRIPTION OF THE BACKGROUND ART

Japanese Patent Application No. H11-280826 discloses a hydraulic shock absorber in which a vehicle body side sleeve and a wheel side tube are slidably and engagably fitted to each other, a damper cylinder is positioned to stand upright in the wheel side tube, a piston rod, which stands upright in the wheel side tube, is inserted in the damper cylinder, a rod side oil chamber and a piston side oil chamber are formed in the damper cylinder by a piston provided at the piston rod, a damping force generator is provided at the piston, and a pressure side damping force generator is provided in the piston side oil chamber of the damper cylinder. In such a hydraulic shock absorber, oil, used for cushioning, is pressurized by a coil spring, to restrain foaming of the oil and to stabilize a damping effect.

However, by using the coil spring to pressurize oil, a certain degree of pressure is applied to from an initial stroke, such that an increase in the rate of the coil spring is required and a relatively large preset is also required. This allows a pressurization amount at the time of cushion stroke to be increased and, consequently, a repelling force might be changed thereby impairing ride comfort. Moreover, due to an increase in weight and complication of the structure by the coil spring, cost is increased.

The present invention has been made to overcome the drawbacks of existing hydraulic shock absorbers. Accordingly, it is an object of the present invention to provide a hydraulic shock absorber which can stably pressurize cushion oil, is light-weight, has a simplified structure and facilitates improvement in the ride comfort to a driver.

SUMMARY OF THE INVENTION

In order to achieve the above objects, the present invention according to a first aspect and feature thereof provides a hydraulic shock absorber for a vehicle. The hydraulic shock absorber comprises a damper cylinder, a piston rod provided with a piston and inserted in the damper cylinder, a rod side oil chamber and a piston side oil chamber which are defined in the damper cylinder by the piston, a damping force generator provided at the piston, and a pressure side damping force generator provided in the piston side oil chamber of the damper cylinder, the pressure side damping force generator is provided with a sub piston that is provided in the piston side oil chamber of the damper cylinder and has a damper force generating function. The hydraulic shock absorber is characterized in that a first separator is provided in a sub piston side oil chamber of the sub piston, the first separator having a communication hole that allows the sub piston side oil chamber and a bladder side oil chamber to be in communication, and a bladder, which has a gas chamber in an interior thereof, mounted in the bladder side oil chamber. A blow hole is provided in the bladder side oil chamber, the blow hole being normally closed by the bladder and opening when oil enters the bladder side oil chamber such that the bladder is contracted by an oil pressure when a volume of the oil reaches a predetermined capacity. Further, the vehicle body side sleeve and a wheel side tube may be slidably and engagably fitted to each other, the damper cylinder may stand upright in the wheel side tube, and the piston rod may stand upright in the wheel side tube.

According such a configuration of a hydraulic shock absorber, at the time of compression, oil, the volume of which corresponds to an entering volume of the piston rod entering the damper cylinder, passes through the damping force generator of the sub piston, moves into the sub piston side chamber from the piston side oil chamber, passes through the communication hole of the first separator, and moves into the bladder side oil chamber. The movement of the oil generates a damping force. When the oil moves into the bladder side oil chamber, the gas chamber of the bladder is contracted by an oil pressure, and the bladder is compressed. In order for the bladder to maintain a constantly stable damping force, the bladder applies a pressure to the bladder side oil chamber and compensates for a variation in the volume of the oil by causing oil which adhering to the piston rod to enter the cylinder by a lower seal, the volume of which corresponds to an entering volume of the piston rod, temperature variation, and the sliding movement of the piston rod. Moreover, a blow hole is provided in the bladder side oil chamber, the blow hole being normally closed by the bladder but may be opened when the bladder is contracted by the oil pressure when the volume of the oil reaches a predetermined capacity, and the oil is allowed to escape into the gas chamber of the outer cylinder portion, for example.

According to the first aspect and feature of the present invention, the bladder contracts according to the volume of the oil entering the bladder side oil chamber and the blow hole is opened such that the hydraulic shock absorber has a volume dependence type blow structure.

Moreover, the pressure side damping force generator has a bladder pressurization type structure such that a coil spring is not required. Therefore, problems such as an increase of the weight and complication of the structure by the coil spring are solved and the comfort of a vehicle occupant is increased. Thus, the weight is reduced, the structure is simplified, the oil can be stably pressurized, the ride comfort is improved, and the amount of pressurization by the change of the volume of the oil and the temperature variation can be compensated.

According to a second aspect and feature of the present invention, a hydraulic shock absorber is provided which comprises a damper cylinder, a piston rod provided with a piston and inserted in the damper cylinder, a rod side oil chamber and a piston side oil chamber which are defined in the damper cylinder by the piston, a damping force generator provided at the piston, and a pressure side damping force generator provided in the piston side oil chamber of the damper cylinder. The hydraulic shock absorber is characterized in that the pressure side damping force generator is provided with a sub piston which is provided in the piston side oil chamber of the damper cylinder and has a damper force generating function. A first separator is provided in a sub piston side oil chamber of the sub piston, the first separator having a communication hole that allows the sub piston side oil chamber and a bladder side oil chamber to be in communication. A bladder is provided, which has a gas chamber in an interior thereof and pressurizes oil and which is mounted in the bladder side oil chamber. Further, blow piston is provided which opens according to a pressure of oil entering the bladder side oil chamber and discharges the oil in the bladder side oil chamber.

According to such a configuration of the hydraulic shock absorber, the oil entering the bladder side oil chamber is pressurized by the bladder, air in the oil is reduced, and the oil is discharged by opening the blow piston when the oil is introduced into the blow piston and reaches the predetermined oil pressure. Therefore, the pressure in the bladder is mainly controlled by the pressurization of the oil and the discharge of the oil is controlled mainly by the blow piston. Therefore, this structure is a pressure dependence type blow structure.

According to a third aspect and feature of the present invention, in addition to the first or second aspect and feature, a second separator which supports the bladder and has a communication hole allowing the gas chamber of the bladder and a gas pressurization chamber to be in communication may be provided in the damper cylinder. Further, a bladder pressurization supply valve, which adjusts a gas pressure, may be provided in the gas pressurization chamber.

According to such a configuration of the hydraulic shock absorber, the bladder pressurization supply valve is provided to allow for adjustment of the pressure of the gas in the bladder. Moreover, ventilation resistance is produced by throttling of the communication hole, thus generating a damping force.

According to a fourth aspect and feature of the present invention, in addition to the first or third aspects and features, a blow hole may be provided in the damper cylinder in order that the oil in the bladder side oil chamber which passes through the blow hole may be allowed to escape into a gas chamber of an outer cylinder portion.

According to a fifth aspect and feature of the present invention, in addition to the first or third aspects and features, a connection shaft for the sub piston may penetrate the first separator and may be connected to a cap at a damper cylinder end portion. Further, a blow hole may be provided in the connection shaft, and the oil in the bladder side oil chamber which passes through the blow hole may be allowed to escape into a gas chamber of an outer cylinder portion through a communication path provided in the connection shaft and the cap, wherein a blow piston may provided in the communication path.

According to such a configuration of the hydraulic shock absorber, the blow piston is provided in order that a blow pressure can be adjusted by the piston which produces a repelling force in the hydraulic shock absorber.

According to a sixth aspect and feature of the present invention, in addition to the first through fifth aspects and features, the bladder may be formed in an annular bag-shape by an annular inner wall, an annular outer wall, and a bottom wall interconnecting the both annular inner and outer walls. A connecting shaft may penetrate into an inside of the annular inner wall. Further, the damper cylinder may be located outside the annular outer wall. One end of the bladder, which is located a bottom wall side end, may be supported by the first separator and the other end of the bladder, which is located on an annular opening side, may be supported to a second separator.

According to a seventh aspect and feature of the present invention, in addition to any of the first through sixth aspects and features, the bladder may have a tapered surface on a first separator side and a blow hole, located on a second separator side, which allows the oil in the bladder side oil chamber to escape.

In the foregoing configurations of the hydraulic shock absorber, even if air is produced in the cylinder, the air can be immediately discharged into the gas chamber of the outer cylinder portion. Further, the pressure is evenly applied to the bladder and the bladder can evenly expand and contract. Moreover, the shape of the bladder can be restricted.

Advantageous Effects of Invention

According the configuration of the first aspect and feature of the present invention, he pressure side damping force generator has a bladder pressurization type structure such that a coil spring is not required. Therefore, problems such as an increase of the weight and complication of the structure by the coil spring are solved and the comfort of a vehicle occupant is increased. Thus, the weight is reduced, the structure is simplified, the oil can be stably pressurized, the ride comfort is improved, and the amount of pressurization by the change of the volume of the oil and the temperature variation can be compensated.

According to the configuration of the third aspect and feature of the present invention, if a second separator which supports the bladder and has a communication hole allowing the gas chamber of the bladder and a gas pressurization chamber to be in communication is provided in the damper cylinder, and a bladder pressurization supply valve, which adjusts a gas pressure, is provided in the gas pressurization chamber, the adjustment of the pressure of the gas in the bladder is made possible, ventilation resistance is produced, and a damping force can be generated.

According to the configuration of the fourth aspect and feature of the present invention, if a blow hole is provided in the damper cylinder, the oil in the bladder side oil chamber may passes through the blow hole and easily escape into a gas chamber of an outer cylinder portion.

According to the configuration of the sixth aspect and feature of the present invention, if a connection shaft for the sub piston penetrates the first separator and is connected to a cap at a damper cylinder end portion, a blow hole is provided in the connection shaft, and the oil in the bladder side oil chamber which passes through the blow hole is allowed to escape into a gas chamber of an outer cylinder portion through a communication path, including a blow piston, is provided in the connection shaft and the cap, the blow pressure can be adjusted by the piston and a suitable repelling force can be produced in the hydraulic shock absorber by the adjustment.

According to the configuration of the seventh aspect and feature of the present invention, if the bladder is formed in an annular bag-shape by an annular inner wall, an annular outer wall, and a bottom wall interconnecting the both walls, a connecting shaft penetrates into an inside of the annular inner wall, the damper cylinder is located outside the annular outer wall, wherein one end of the bladder, which is located a bottom wall side end, may be supported by the first separator and the other end of the bladder, which is located on an annular opening side, may be supported to a second separator, an oil pressure is evenly applied to the bladder and the bladder can be evenly expanded and contracted. Moreover, the shape of the bladder can be restricted and is not varied. If the bladder has a taper surface on a first separator side and a blow hole which allows the oil in the bladder side oil chamber to escape is located on a second separator side, an oil pressure is evenly applied to the bladder and the bladder can be evenly expanded and contracted. Moreover, the shape of the bladder can be restricted.

DETAILED DESCRIPTION OF ILLUSTRATIVE EMBODIMENTS

A number of illustrative embodiments of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention. Here, the drawings are viewed in the direction of numerals.

Figure 1:
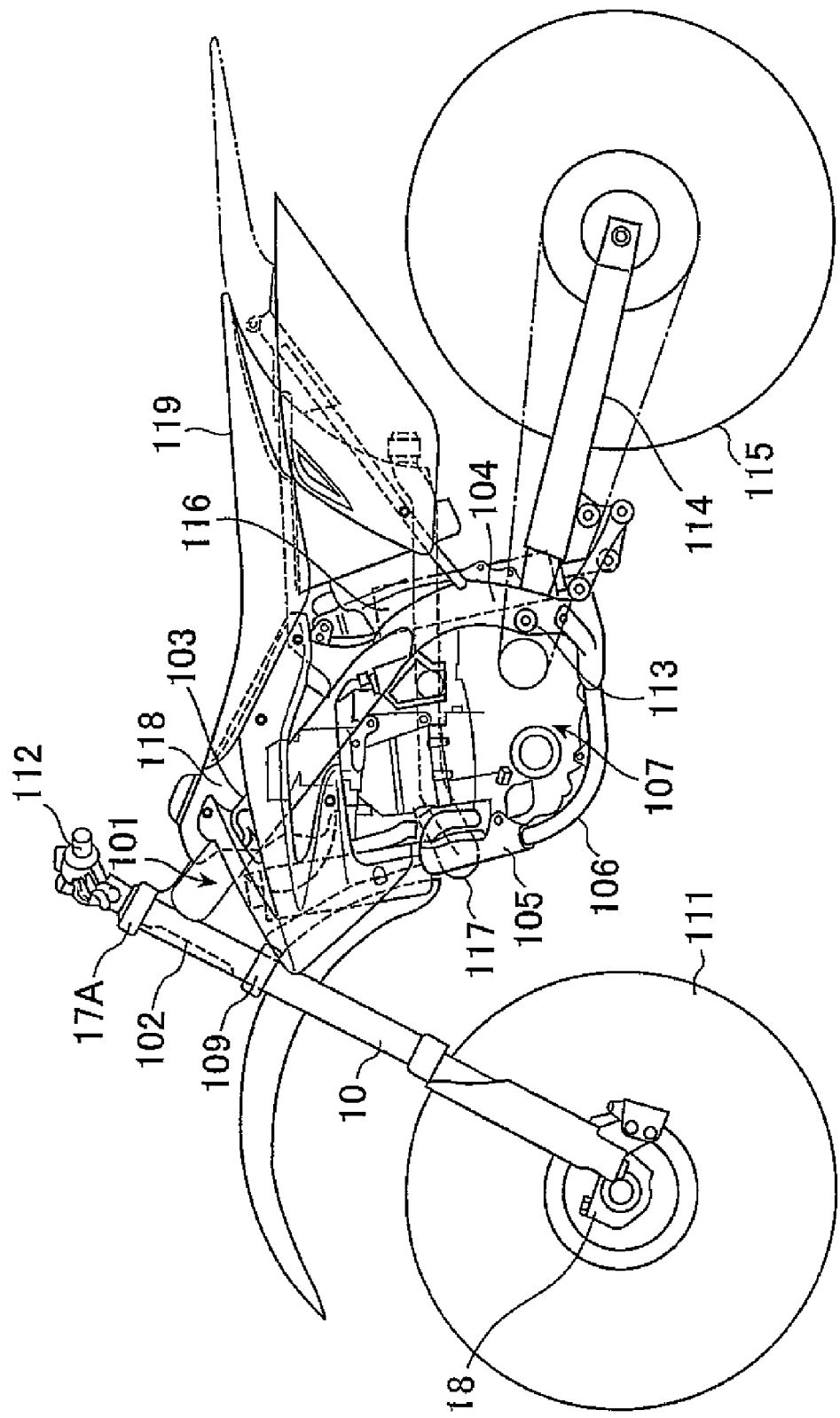
FIG. 1 is a side view of an off-road type motorcycle including a hydraulic shock absorber according to a selected embodiment of the present invention.

FIG. 1 shows a side view of an off-road type motorcycle to which a first illustrative embodiment of the present invention is applied. A vehicle body frame 101 of this motorcycle includes a head pipe 102, main frames 103, center frames 104, a down frame 105 and lower frames 106. These are connected in a loop form, inside of which an engine 107 is supported. The main frames 103, the center frames 104 and the lower frames 106 are provided in pairs in a right-left direction. The single head pipe 102 and the single down frame 105 are provided along a center of a vehicle body.

The main frames 103 linearly and obliquely descend above the engine 107, extend rearward, and are connected to upper end portions of the center frames 104 extending vertically in the rear of the engine 107. The down frame 105 obliquely descends in the front of the engine 107, extends downward, and is connected at a lower end portion thereof to front end portions of the lower frames 106. The lower frames 106 are bent downward of the engine 107 from a front lower portion of the engine 107, substantially linearly extend rearward, and are connected at rear end portions thereof to lower end portions of the center frames 104.

An upper portion of a front fork 10 is supported to the head pipe 102 via a top bridge 108 and a bottom bridge 109. A front wheel 111 which is supported to a lower end portion of the front fork 10 is steered by a handlebar 112. A front end portion of a rear arm 114 is swingably supported to the center frames 104 by a pivot axis 113. A rear wheel 115 is supported to a rear end portion of the rear arm 114 and chain-driven by the engine 107.

The motorcycle also includes a cushion unit 116 of a rear suspension, an exhaust pipe 117 which is bent from a front portion of a cylinder, extends rearward, and is connected to a muffler (omitted from the illustration) at a rear portion of the vehicle body, a fuel tank 118 arranged above the upright-standing-type cylinder of the engine 107, and a seat 119 arranged in the rear of the fuel tank 118.

Figure 2:
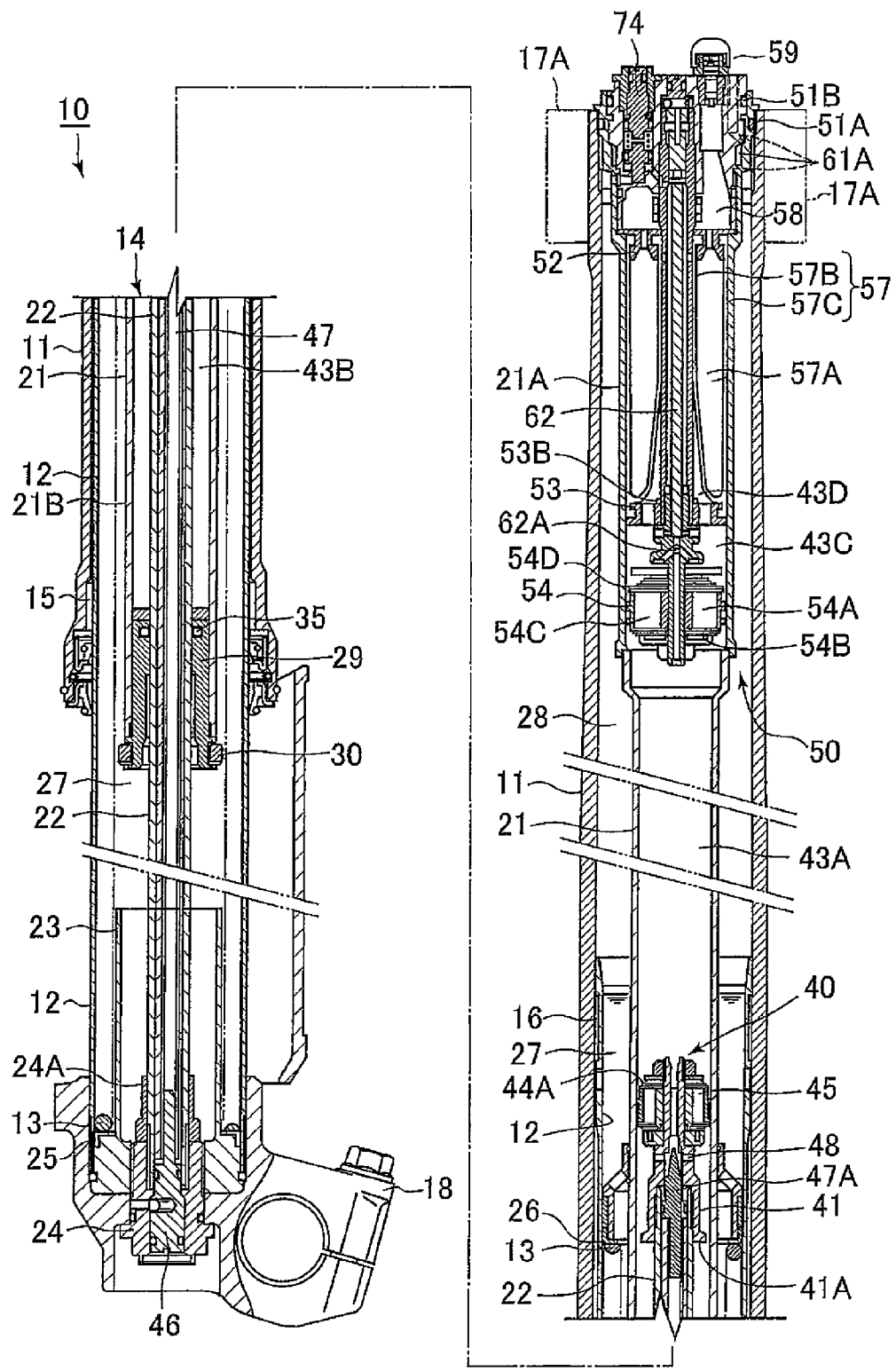
FIG. 2 is a schematic view showing a front fork according to the present invention.

Referring now to FIG. 2, the front fork 10 has a lower wheel-side tube 12 slidably inserted in an upper upper sleeve 11, with a suspension spring 13 interposed between the tubes 11, 12 so as to extend from a lower portion to an intermediate portion. A single cylinder type damper 14 is invertedly provided in the intermediate portion.

A bush 15, which slidably contacts an outer circumferential portion of the lower wheel-side tube 12, is engagably fitted in an inner circumferential portion of a lower end of the upper upper sleeve 11. A bush 16, which slidingly contacts the inner circumferential portion of the upper sleeve 11, is engagably fitted on an outer circumferential portion of an upper end of the wheel-side tube 12.

The upper sleeve 11 is supported at an upper end thereof to the vehicle body side via an upper bracket 17A and similarly supported at an intermediate portion thereof to the vehicle body side via a lower bracket 17B. The wheel-side tube 12 is coupled at a lower end thereof to an axle via an axle bracket 18.

Figure 3:
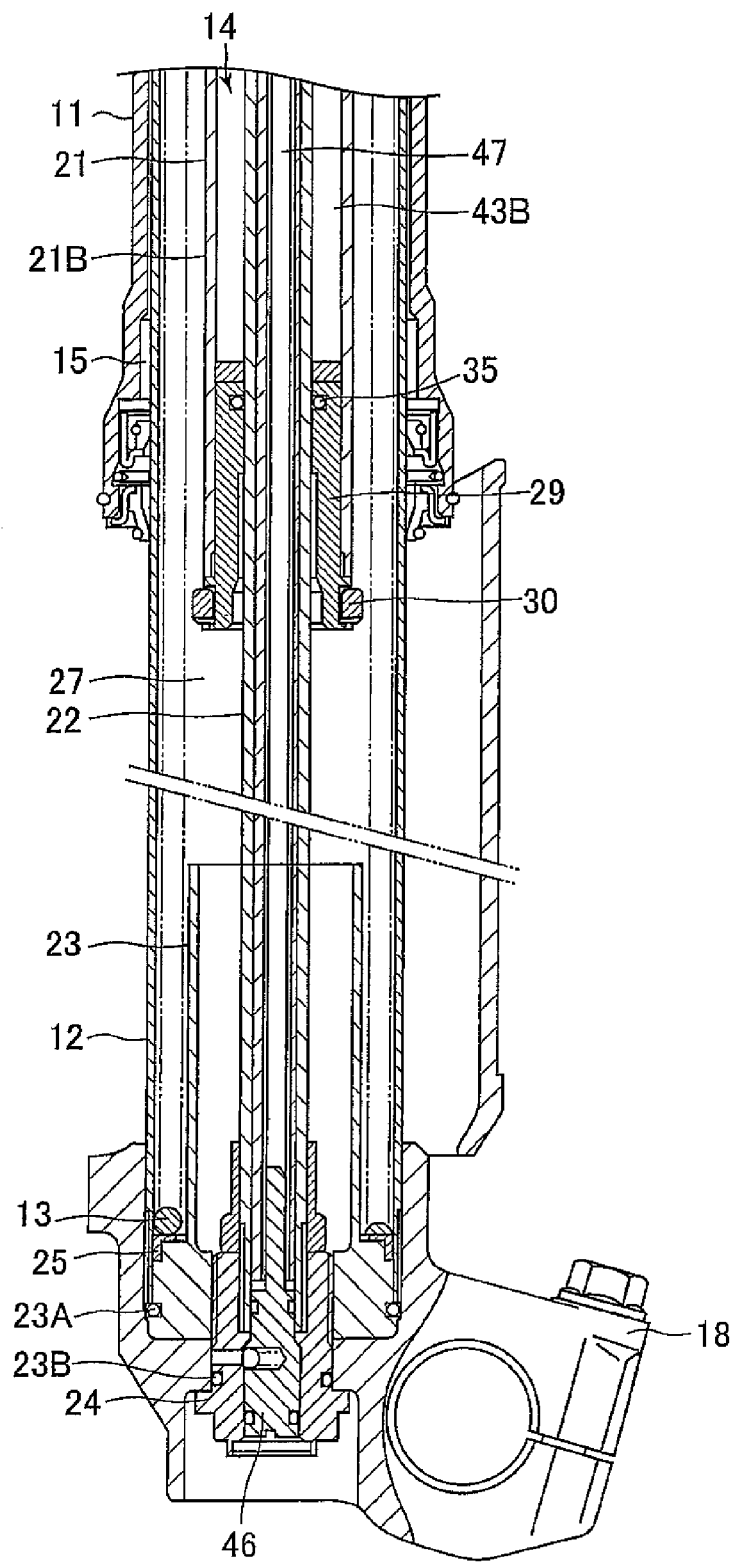
FIG. 3 is an enlarged view showing a lower portion of the front fork according to the present invention.

In an inner circumference of the lower end of the wheel-side tube 12, as shown in FIG. 3, an oil lock collar 23 is fitted in the axle bracket 18 and sealed through an O-ring 23A. This oil lock collar 23 is sealed and fixed through an O-ring 23B to the axle bracket 18 by a bottom bolt 24. A base end portion of a piston rod (hollow rod) 22 of the single cylinder type damper 14 at the intermediate portion is threadably fitted in the bottom bolt 24 and locked by a lock nut 24A. A tip end portion of the piston rod 22 is inserted in a damper cylinder 21, having a hollow bore formed therein.

Figure 4:
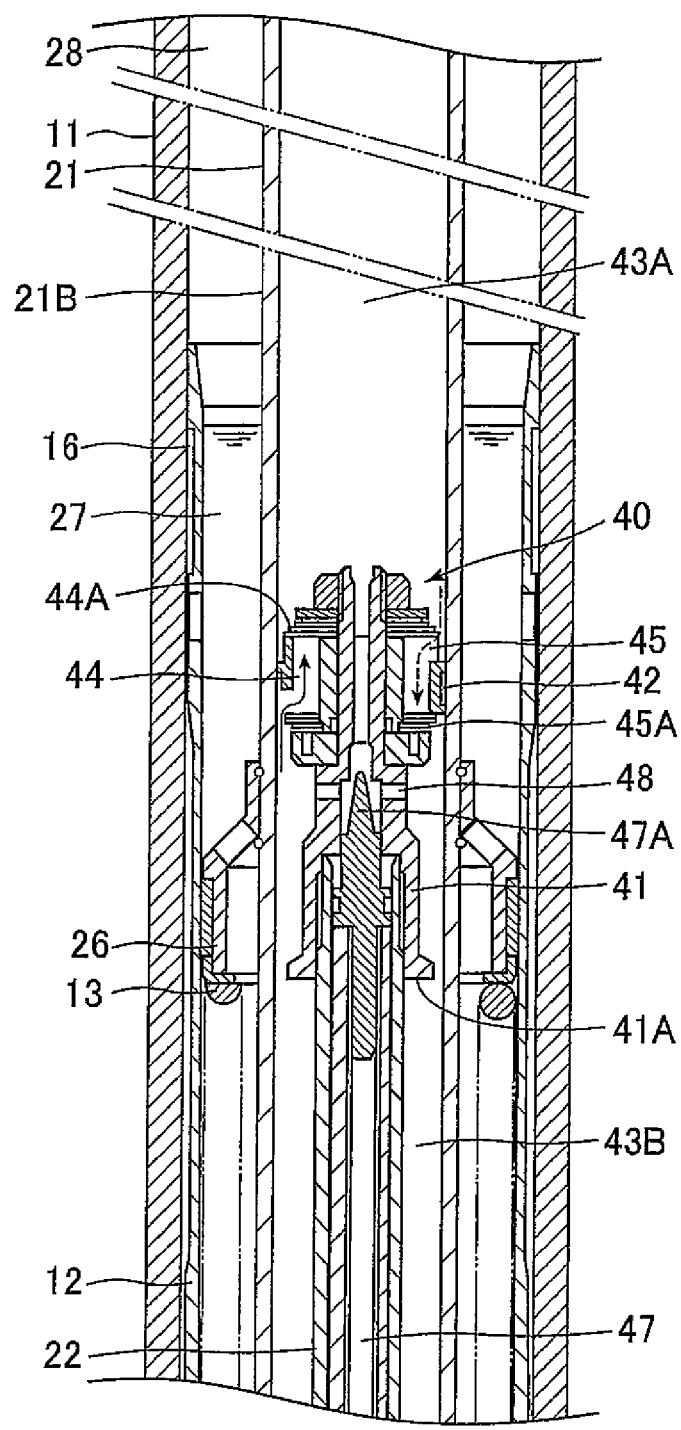
FIG. 4 is an enlarged view showing an intermediate portion of the front fork according to the present invention.

The suspension spring 13 is provided between a first spring receiver 25, mounted around an outer circumferential surface of a base end portion of the oil lock collar 23, and a second spring receiver 26 fixed around an outer circumferential surface of an intermediate portion of the damper cylinder 21 (lower cylinder tube 21B) shown in FIG. 4. Moreover, in the interiors of the upper sleeve 11 and wheel-side tube 12, an oil chamber 27 and a gas chamber 28 are provided. Gas which is trapped within the gas chamber 28 forms a gas spring. An elastic force of the gas spring and the suspension spring 13 produce a repelling force against an input force which the vehicle receives from the road surface.

Figure 5:
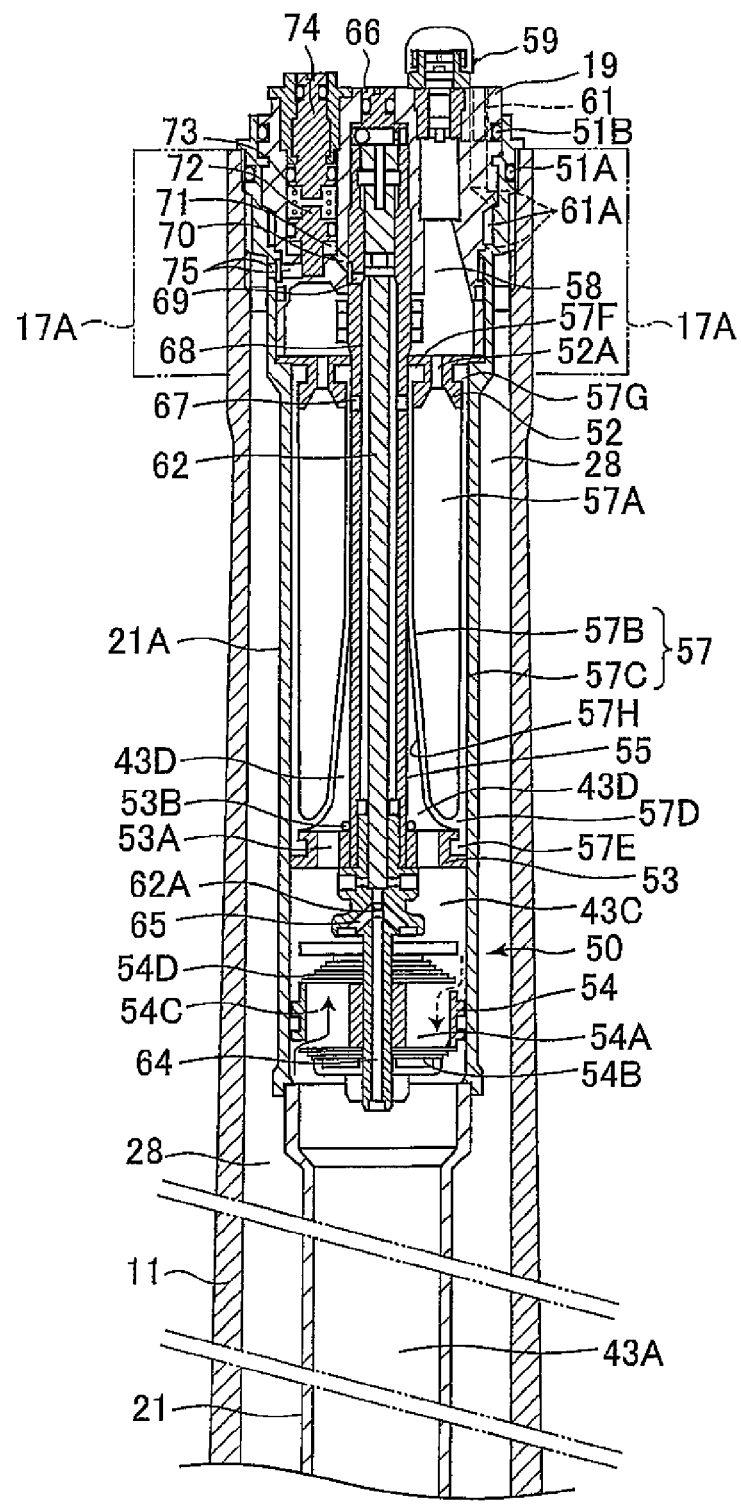
FIG. 5 is an enlarged view showing an upper portion of the front fork according to the present invention.

The single cylinder type damper 14 includes a lower piston valve 40 (elongation side damping force generator), as shown in FIG. 4, and an upper valve 50 (pressure side damping force generator) 50, as shown in FIG. 5.

During vehicle operation, the single cylinder type damper 14 restrains expansion/contraction vibration of the vehicle body side-tube 11 and wheel-side tube 12, by damping forces generated by the lower piston valve 40 and upper valve 50, in order to aid in absorption of a shock force by the suspension spring 13 and the gas spring.

In addition, the damper cylinder 21 of the single cylinder type damper 14 is divided into upper and lower cylinder tubes 21A, 21B in order to facilitate assembly operations, including installation of the upper valve 50 into the damper cylinder 21. The upper and lower cylinder tubes 21A, 21B are welded to a coupling member.

As shown in FIG. 3, a rod guide 29 is threadably mounted in an inner circumference of a lower end portion of the lower cylinder tube 21B of the damper cylinder 21. Moreover, an oil lock collar 30 is idly mounted around the lower end portion of the lower cylinder tube 21B, and an oil seal portion 35 is mounted in an upper end of the rod guide 29 extending around the rod 22. Each time the front fork 10 is stroked, the oil seal portion 35 may bring a working fluid into the interior of the damper cylinder 21 which adheres to an outer circumferential surface of the piston rod 22 which is located in the oil chamber 27 inside the wheel-side tube 12.

Next, a damping mechanism of the front fork 10 will be explained.
Valve Assembly As shown in FIG. 4, in the lower piston valve 40 (elongation side damping force generator), a piston holder 41 is mounted on a tip end portion of the piston rod 22 and a main piston (hereinafter referred to merely as "piston") 42 is mounted to the piston holder 41.

The piston 42 is slidingly contacted with an interior of the damper cylinder 21 (lower cylinder tube 21B) and divides the interior of the damper cylinder 21 into a piston side oil chamber 43A in which the piston rod 22 is not housed, and a rod side oil chamber 43B in which the piston rod 22 is housed. The piston 42 is provided with a pressure side flow path 45 and a pressure side valve (check valve) 45A as well as an elongation side flow path 44 and an elongation side valve 44A. These flow paths 44, 45 allow the piston side oil chamber 43A and the rod side oil chamber 43B to be in communication.

Moreover, a damping force adjusting rod 47, which is coupled to an adjuster 46, (refer to FIG. 3) is inserted in a hollow portion of the piston rod 22. By a needle 47A of a tip end of this damping force adjusting rod 47, the lower piston valve 40 allows a flow path area of a bypass path 48, which is provided in the piston holder 41 for the piston side oil chamber 43A and the rod side oil chamber 43B, to be adjusted. Therefore, at the time of the compression of the front fork 10, oil in the piston side oil chamber 43A passes through the pressure side flow path 45, opens the pressure side valve 45A, and is introduced into the rod side oil chamber 43B.

Moreover, at the time of the elongation of the front fork 10, if a relative speed between the damper cylinder 21 and the piston rod 22 is a low speed, oil in the rod side oil chamber 43B passes through the bypass path 48, in which the needle 47A is present, and is introduced into the piston side oil chamber 43A, during which an elongation side damping force is generated due to a throttle resistance of the needle 47A. This damping force is adjusted by adjusting the position of the needle 47A by the adjuster 46 (refer to FIG. 3).

Moreover, at the time of the elongation of the front fork 10, if the relative speed between the damper cylinder 21 and the piston rod 22 is a middle or high speed, the oil in the rod side oil chamber 43B passes through the elongation side flow path 44 as indicated by a solid-line arrow, causes the elongation side valve 44A to be elastically deformed, and is introduced into the piston side oil chamber 43A, thus producing the elongation side damping force. In addition, at the time of the contraction of the front fork 10, the oil in the piston side oil chamber 43A passes through the pressure side flow path 45 as indicated by a broken-line arrow, causes the pressure side valve 45A to be elastically deformed, and flows back to the rod side oil chamber 43B.
Upper Valve The upper valve 50 (pressure side damping force generator) according to the first illustrative embodiment has a bladder pressurization-type cushion structure. As shown in FIG. 5, the upper valve 50 is provided at an upper end portion of the upper sleeve 11. The upper end portion of the damper cylinder 21 (upper cylinder tube 21A) of the single cylinder type damper 14 is threadably mounted in the inner circumference of the upper sleeve 11 through an O-ring 51A. A cap 19 is sealed and threadably mounted in the inner circumference of the upper end portion of the upper cylinder tube 21A through an O-ring 51B.

An upper separator (second separator) 52, a lower separator (first separator) 53, and a sub piston 54 are provided inside the upper cylinder tube 21A so as to be arranged from the upper end side. The upper separator 52, lower separator 53 and sub piston 54 are connected by a center shaft 55. An upper end portion of the center shaft 55 is engagably fitted in the cap 19. 53B designates a removal stop ring for the lower separator 53. The sub piston 54 is provided with an elongation side flow path 54A, an elongation side valve 54B, a pressure side flow path 54C, and a pressure side valve 54D. These flow paths 54A, 54C, allow the piston side oil chamber 43A and the sub piston side oil chamber 43C to be in communication with one another.

At the time of the compression of the front fork 10, the oil in the piston side oil chamber 43A passes through the pressure side flow path 54C as indicated by a solid-line arrow, causes the pressure side valve 54D to be elastically deformed, and is introduced in the sub piston side oil chamber 43C, thus producing the elongation side damping force.

A hollow bladder 57 is provided in a bladder side oil chamber 43D, defined between the upper and lower separators 52, 53. The bladder 57 is a rubber-made elastic member in an annular bag-shape which has a gas chamber (bladder inner gas chamber) 57A formed therein. The bladder 57 is provided with an annular inner wall 57B, an annular outer wall 57C, and a bottom wall 57D interconnecting lower end portions of the both walls in a bag-shape.

A lower stopping portion 57E in an annular shape is provided around an outer circumference of the bottom wall 57D and engagably stopped between the lower separator 53 and the upper cylinder tube 21A. Moreover, upper ends of the annular inner wall 57B and annular outer wall 57C are annularly opened, an inner stopping portion 57F in an annular shape is provided around an upper end of the annular inner wall 57B, and an outer stopping portion 57G in an annular shape is provided around an upper end of the annular outer wall 57C. The inner stopping portion 57F is engagably stopped between the connection shaft 55 and the upper separator 52, and the outer stopping portion 57G is engagably stopped between the upper separator 52 and the upper cylinder tube 21A. The annular inner wall 57B of the bladder 57 is provided with a tapered surface 57H which faces toward the lower separator 53 side and is formed so as to be separated from the connection shaft 55.

The lower separator 53 is formed with a communication hole 53A which allows the sub piston side oil chamber 43C and the bladder side oil chamber 43D to be in communication. At the time of the compression of the front fork 10, the oil passes through the communication hole 53A, thereby generating a damping force. Moreover, a gas pressurization chamber 58 is formed between the upper separator 52 and the cap 19, and the upper separator 52 is formed with a communication hole 52A which allows the gas chamber 57A of the bladder 57 and the gas pressurization chamber 58 to be in communication. At the time of the compression of the front fork 10, the gas passes through the communication hole 52A, thereby producing a damping force.

Pressurized gas, for example, nitrogen gas, etc. can be supplied to the gas pressurization chamber 58 through a bladder pressurizing supply valve 59 which is provided at the cap 19. A check valve is provided at the bladder pressurizing supply valve 59. The bladder pressurizing supply valve 59 is a valve that adjusts a gas pressure of nitrogen gas, etc. applied to the gas chamber 57A of the bladder 57.

Moreover, an outer cylinder supply valve 61 shown with a broken line is provided at the cap 19, in parallel to the bladder pressurizing supply valve 59, communicates through three paths 61A with the gas chamber 28 formed between the upper sleeve 11 and the upper cylinder tube 21A, and allows the pressurized gas to be supplied to the gas chamber 28. The outer cylinder supply valve 61 allows the pressure of the outer cylinder portion (gas chamber 28) to bleed to atmospheric pressure or corrects the pressure, according to change in atmospheric pressure and temperature. In addition, the outer cylinder portion may be suitably pressurized.

The connection shaft 55 has a hollow shape through which a needle 62 penetrates the cap 19 from the upper direction of the cap 19. A needle valve 62A is provided at a lower end of the needle 62 and can adjust a bypass amount between an oil path 64 vertically opened in the piston side oil chamber 43A of the needle 62, and an oil path 65 obliquely opened in the sub piston side oil chamber 43C of the needle 62. A needle adjuster 66 is provided at the cap 19 so as to be able to adjust the movement amount of the needle 62, and mainly adjusts the damping force at the time of the compression of the front fork 10.

Around the upper end of the annular inner wall 57B of the bladder 57, a blow hole 67 is provided in a circumferential wall of the connection shaft 55. The blow hole 67 is a hole that allows the oil in the bladder side oil chamber 43D to escape and is located on the upper separator 52 side. The blow hole 67 is normally closed by the bladder 57 and allows the bladder side oil chamber 43D and an annular space 68 between the connection shaft 55 and the needle 62 to be in communication. When the volume of the oil in the bladder side oil chamber 43D exceeds a predetermined capacity, the bladder 57 is pressed according to the oil capacity and contracted/deformed (refer to FIG. 6A, for example).

When the bladder 57 is deformed in this way, the oil in the bladder side oil chamber 43D flows into the annular space 68 and the oil in the annular space 68 then flows into a communication chamber 71 via an opening 69 provided in the connection shaft 55, and an opening 70 provided in the cap 19.

A blow piston 72 is arranged in the communication chamber 71 and biased downward by a coil spring 73 which is retained by a blow adjuster 74 that is provided at the cap 19. When an oil pressure in the communication chamber 71 exceeds a set value, the blow piston 72 is retreated upward against the coil spring 73. When the blow piston 72 is retreated upward, an opening 75 which is provided in the cap 19 and the upper cylinder tube 21A allows the communication chamber 71 and the gas chamber 28 formed between the upper sleeve 11 and the upper cylinder tube 21A to be in communication, and the oil in the communication chamber 71 escapes into the gas chamber 28. The blow adjuster 74 adjusts the pressure at the time of escaping of the oil from the gas chamber 28.

While the opening 70 through which the oil passes is obliquely formed, the opening 75 communicating with the gas chamber 28 is formed perpendicularly to an axis of the blow piston 72. Therefore, the oil, which enters the communication chamber 71 from the opening 70, causes the blow piston 72 to be retreated upward, whereas the gas pressure in the gas chamber 28 communicating with the opening 75 hardly acts on the blow piston 72. Thus, the blow piston 72 is not affected by the gas pressure in the gas chamber 28.

Figure 6A:
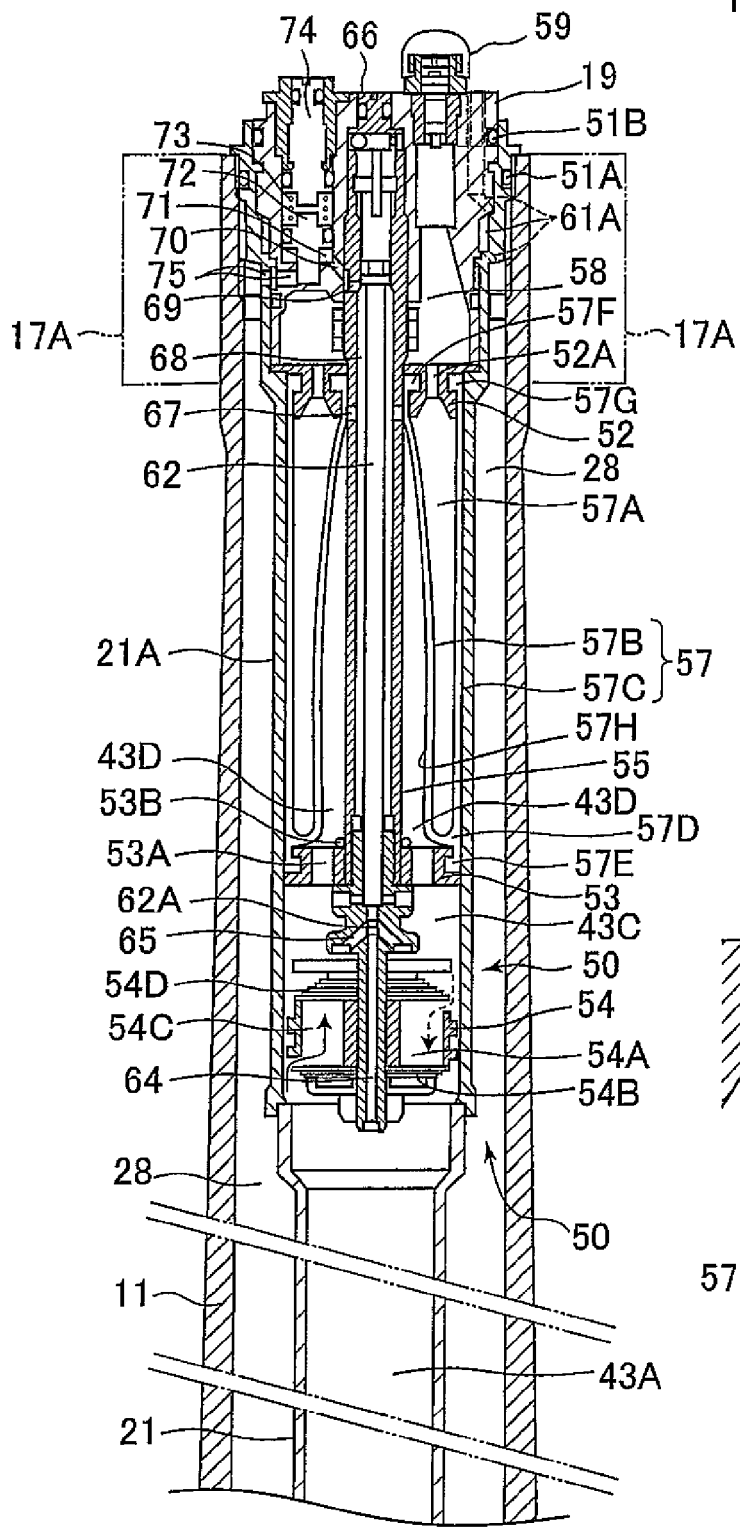
FIG. 6A is an enlarged view showing a modification of a bladder of the front fork hereof.
Figure 6B:
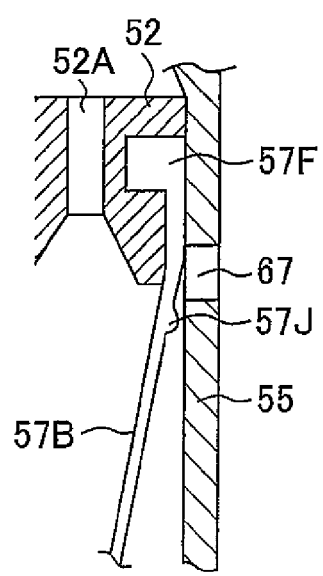
FIG. 6B is an enlarged section view showing a support portion for the bladder of FIG. 6A.

As shown in FIG. 6B, a bulged portion 57J is formed integrally with an outer surface of an upper portion of the annular inner wall 57B of the bladder 57. The bulged portion 57J is annularly provided so as to surround the circumferential wall of the connection shaft 55, located below the blow hole 67, adjacent to the circumferential wall of the connection shaft 55 and closely contactable with the circumferential wall. With this configuration, in a state shown in FIG. 5, the annular inner wall 57B of the bladder 57 and the circumferential wall of the connection shaft 55 are closely contacted with each other through the bulged portion 57J. Thus, a tighter seal is provided as compared with a case of a surface seal in a state without the bulged portion 57J.

The upper separator 52 retains the bladder 57 so as not to allow the bladder 57 to be twisted when the bladder 57 is installed, and has the communication hole 52A which generates a suitable damping force at the time of the movement of the gas in the bladder. The lower separator 53 prevents the bladder from being excessively inflated, even if the volume of the oil in the bladder side oil chamber 43D is reduced due to leakage and temperature variation, and has the communication hole 53A which produces a suitable damping force at the time of the movement of the oil into a bladder portion.

In the first illustrative embodiment, at the time of the compression of the front fork 10, oil corresponding in volume to that of the piston rod 22 entering the damper cylinder 21, passes through the pressure side flow path 54C and pressure side valve 54D of the sub piston 54, moves into the sub piston side oil chamber 43C from the piston side oil chamber 43A, further passes through the communication hole 53A of the lower separator 53, and moves into the bladder side oil chamber 43D, during which a damping force is generated. When the oil moves into the bladder side oil chamber 43D, the bladder 57 is pushed in an outer circumferential direction by an oil pressure as shown in FIG. 6A, and the gas in the gas chamber 57A of the bladder 57 passes through the communication hole 52A and moves into the gas pressurization chamber 58. When the gas moves through the communication hole 52A, a damping force can be generated. In order that a constantly stable damping force is maintained, the bladder 57 has the function of applying a pressure to the oil in the bladder side oil chamber 43 and compensating the oil corresponding in volume to the amount of the piston rod 22 which enters, and variation in the volume of the oil according to the temperature variation. Usually, the blow hole 67 of the connection shaft 55 is closed by the bladder 57. However, when the bladder 57 is contracted by the oil pressure and the volume of the oil reaches a predetermined volume as shown in FIG. 6B, the blow hole 67 opens and blown oil is introduced into the communication chamber 71. The blow piston 72 is biased by a predetermined biasing force in the communication chamber 71 and, when the oil pressure exceeds the predetermined biasing force, the communication chamber 71 opens and the oil is allowed to escape into, for example, the gas chamber 28 of the outer cylinder portion.

When the relative speed between the damper cylinder 21 and the piston rod 22 is a low speed, a pressure side damping force is obtained due to a throttle resistance by the needle valve 62A at the lower end of the needle 62. This damping force is adjusted by adjusting of the position of the needle 62 by the needle adjuster 66. Moreover, when the relative speed between the damper cylinder 21 and the piston rod 22 is a middle or high speed, the oil that passes through the pressure side flow path 54C from the piston side oil chamber 43A, as indicated by a solid-line arrow, causes the pressure side valve 54D to be elastically deformed and is introduced into the sub piston side oil chamber 43C, thus generating the pressure side damping force.

At the time of the elongation of the front fork 10, oil that corresponds in volume to a retreating amount of the piston rod 22 retreating from the damper cylinder 21 passes through the elongation side flow path 54A of the sub piston 54 from the sub piston side oil chamber 43C as indicated by a broken-line arrow and is flowed back into the piston side oil chamber 43A.

In the first illustrative embodiment, the bladder 57 contracts according to the volume of the oil entering the bladder side oil chamber 43D, causing the blow hole 67 to be opened (volume dependence-type blow structure) and causing the oil blown from the blow hole 67 to be introduced into the communication chamber 71. The oil is controlled by the blow piston 72 in the communication chamber 71 and allowed to escape into the gas chamber 28 of the outer cylinder portion according to the oil pressure, so that the discharge of the oil is also controlled by the blow piston 72 (pressure dependence-type blow structure).

In the first illustrative embodiment, the pressure side damping force generator 50 has a bladder pressurization type structure, such that a coil spring, etc. is not required and problems such as the increase of the weight and the complication of the structure by the coil spring are solved. Further, the comfort of the ride, which is effected by a change in the repelling force, is also increased. Therefore, the weight is reduced, the structure is simplified, the oil can be stably pressurized, the ride comfort is improved, and the amount of pressurization by the change of the volume of the oil and the temperature variation can be compensated.

Moreover, in the present invention, the cap 19 is provided with the bladder pressurizing supply valve 59 such that adjustment of the pressure of the gas (nitrogen gas) in the bladder 57 can be made. Moreover, the cap 19 is provided with the blow piston 72 such that the blow pressure can be adjusted by the piston 72 and the adjustment allows the damping force to be generated in the hydraulic shock absorber. Moreover, the blow adjuster 74 is provided such that the pressure which causes the oil to escape into the gas chamber 28 can be adjusted.

The bladder 57 is formed in an annular bag shape from the annular inner wall 57B, the annular outer wall 57C, and the bottom wall 57D interconnecting the both walls in a bag-shape, the connection shaft 55 penetrates into the inside of the annular inner wall 57B, the damper cylinder 21A is located outside the annular outer wall 57C, ends 57E on the bottom wall 57D side are supported to the lower separator 53, and the other ends 57G, F on the side of an annular opening opened at the upper end portion are supported to the upper separator 52, so that the shape of the bladder 57 is restricted, forced deformation of the bladder 57 can be prevented, and the bladder 57 evenly expands and contracts. Moreover, the bladder 57 has the tapered surface 57H on the lower separator 53 side, and the blow hole 67 which allows the oil in the bladder side oil chamber 43D to escape is located on the upper separator 52 side, so that the oil pressure is evenly applied to the bladder 57.

Figure 7:
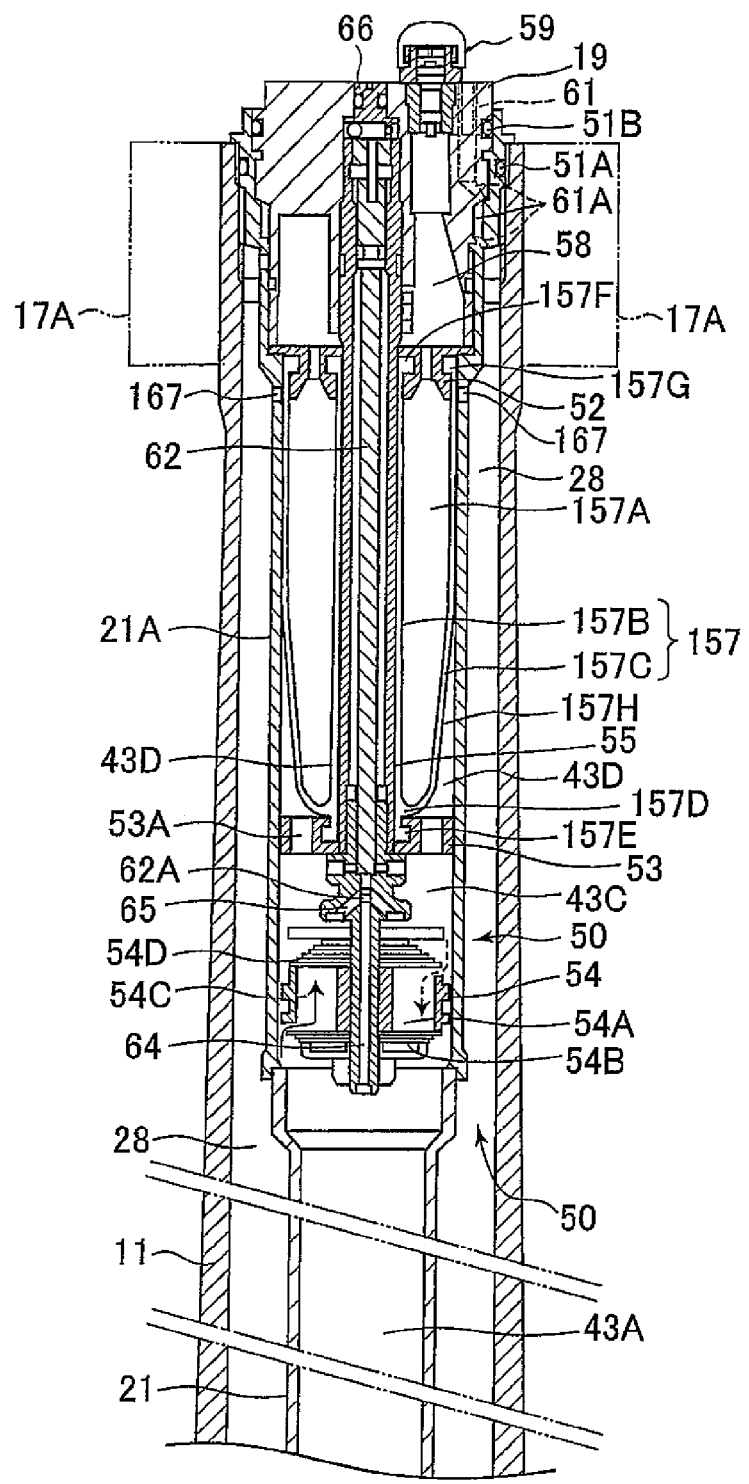
FIG. 7 is an enlarged view showing an upper portion of a front fork according to a second illustrative embodiment of the present invention.

FIG. 7 shows an enlarged view showing an upper portion of a front fork according to a second illustrative embodiment of the present invention. In addition, in FIG. 7, parts that are identical to those of FIG. 5 are designated with the same reference signs, and description of them will be omitted. In the second illustrative embodiment, a bladder 157 is provided so as to be arranged in the bladder side oil chamber 43D between the upper separator 52 and the lower separator 53. The bladder 157 is a rubber-made member in an annular bag-shape that has a gas chamber 157A therein. The bladder 157 is provided with an annular inner wall 157B, an annular outer wall 157C, and a bottom wall 157D interconnecting lower end portions of the both the annular inner wall 157B and the annular outer wall 157C. A lower stopping portion 157E in an annular shape is provided around an outer circumference of the bottom wall 157D and engagably stopped between the lower separator 53 and the upper cylinder tube 21A. Moreover, upper ends of the annular inner wall 157B and annular outer wall 157C are annularly opened, an inner stopping portion 157F in an angular shape is provided around the upper end of the annular inner wall 157B, and an outer stopping portion 157G in an annular shape is provided around the upper end of the annular outer wall 157C. The inner stopping portion 157F is engagably stopped between the connection shaft 55 and the upper separator 52. The outer stopping portion 157G is engagably stopped between the upper separator 52 and the upper cylinder tube 21A. In the second illustrative embodiment, the annular outer wall 157C of the bladder 157 is directed to the lower separator 53 side and provided with a tapered surface 157H so as to be spaced apart from the inner circumferential surface of the upper cylinder tube 21A.

In the second illustrative embodiment, in the vicinity of an upper end 157B of the bladder 157, a blow hole 167 is provided in the circumferential wall of the upper cylinder tube 21A. The blow hole 167 is a hole that allows the oil in the bladder side oil chamber 43D to escape, and located on the upper separator 52 side. The blow hole 167 is normally closed by the bladder 157 and allows the bladder side oil chamber 43D and the gas chamber 28 formed between the upper sleeve 11 and the upper cylinder tube 21A to be in communication. When the volume of the oil in the bladder side oil chamber 43D exceeds a predetermined capacity and the bladder 157 is deformed according to the volume of the oil, the oil in the bladder side oil chamber 43D is allowed to escape into the gas chamber 28.

In this structure, the bladder 157 contracts according to the volume of the oil entering the bladder side oil chamber 43D and causes the blow hole 167 to be opened, so that this structure is a volume dependence type blow structure.

In this structure, the blow hole 167 is provided in the circumferential wall of the upper cylinder tube 21A (damper cylinder 21), so that the oil easily escapes into the gas chamber 28.

Figure 8:
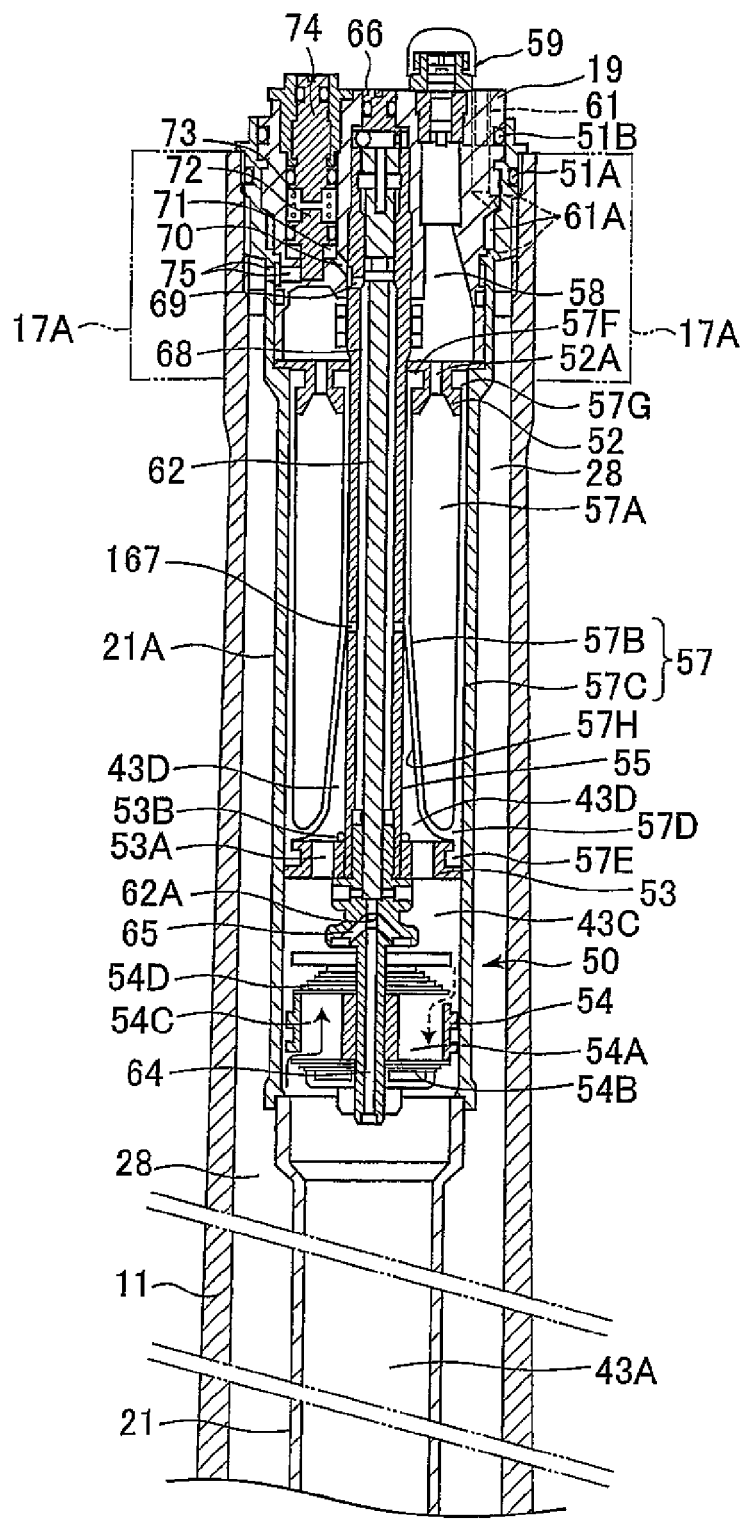
FIG. 8 is an enlarged view showing an upper portion of a front fork according to a third illustrative embodiment of the present invention.

FIG. 8 shows an enlarged view showing an upper portion of a front fork according to a third illustrative embodiment of the present invention. In addition, in FIG. 8, parts that are identical to those of FIG. 5 are designated with the same reference signs, and description of them will be omitted. In the third illustrative embodiment, the bladder 57 is provided so as to be arranged in the bladder side oil chamber 43D between the upper separator 52 and the lower separator 53. The bladder 57 is a rubber-made member in an annular bag-shape that has the gas chamber 57A therein. The bladder 57 is provided with an annular inner wall 57B, an annular outer wall 57C, and a bottom wall 57D interconnecting the lower end portions of the annular inner wall 57B and the annular outer wall 57C in a bag-shape. The lower stopping portion 57E in an annular shape is provided around the outer circumference of the bottom wall 57D and engagably stopped between the lower separator 53 and the upper cylinder tube 21A. Moreover, the upper ends of the annular inner wall 57B and annular outer wall 57C are annularly opened. The inner stopping portion 57F in an annular shape is provided around the upper end of the annular inner wall 57B. The outer stopping portion 57G in an angular shape is provided around the upper end of the annular outer wall 57C. The inner stopping portion 57F is engagably stopped between the connection shaft 55 and the upper separator 52. The outer stopping portion 57G is engagably stopped between the upper separator 52 and the upper cylinder tube 21A.

In the third illustrative embodiment, the blow hole 167 which is provided in the circumferential wall of the connection shaft 55 is not provided in the vicinity of the upper end 57B of the bladder 57 but is provided in an intermediate region of the bladder 57 in a vertical direction and provided in a considerably lower position as compared to the first illustrative embodiment as show in FIG. 5. The blow hole 167 is a hole that allows the oil in the bladder side oil chamber 43D to escape, and opens immediately according to the deformation of the bladder 57 if the volume of the oil in the bladder side oil chamber 43D is even slightly increased. The oil in the bladder side oil chamber 43D is blown from the blow hole 167 and introduced into the communication chamber 71. Then, the oil is controlled by the blow piston 72 in the communication chamber 71, and allowed to escape into the gas chamber 28 of the outer cylinder portion according to the oil pressure.

In this structure, the pressure in the gas chamber 57A of the bladder 57 is used mainly for pressurization of the oil (prevention of the generation of air), and oil discharge is controlled mainly by the blow piston 72. Therefore, this structure is a pressure dependence type blow structure.

While illustrative embodiments of the present invention have been explained in detail with reference to the drawings, the concrete constitution of the present invention is not limited to the illustrative embodiments. Those skilled in the art will realize that many modifications of the illustrative embodiment could be made which would be operable. All such modifications, which are within the scope of the claims, are intended to be within the scope and spirit of the present invention.

What is claimed is:

1. A hydraulic shock absorber comprising:
    a damper cylinder having a hollow bore formed therein;
    a piston rod provided with a piston and inserted in the bore of the damper cylinder, the piston operable to divide the bore into a rod side oil chamber and a piston side oil chamber on opposite sides of the piston;
    a damping force generator provided at the piston;
    a pressure side damping force generator provided in the piston side oil chamber of the damper cylinder;
    the pressure side damping force generator is provided with a sub piston that is provided in the piston side oil chamber of the damper cylinder and has a damper force generating function;
    a first separator is provided in a sub piston side oil chamber of the sub piston, the first separator having a communication hole that allows the sub piston side oil chamber and a bladder side oil chamber to be in communication; and
    a bladder, which has a gas chamber in an interior thereof, is mounted in the bladder side oil chamber, wherein:
    a blow hole is provided in the bladder side oil chamber, the blow hole being normally closed by the bladder and opening when oil enters the bladder side oil chamber, and
    the bladder is contracted by an oil pressure when a volume of the oil reaches a predetermined capacity.

2. The hydraulic shock absorber according to claim 1, further comprising:
    a second separator, which supports the bladder and has a communication hole allowing the gas chamber of the bladder and a gas pressurization chamber to be in communication, provided in the damper cylinder, and
    a bladder pressurization supply valve, which adjusts a gas pressure, provided in the gas pressurization chamber.

3. The hydraulic shock absorber according to claim 2, wherein the blow hole is provided in the damper cylinder and the oil in the bladder side oil chamber which passes through the blow hole is allowed to escape into a gas chamber of an outer cylinder portion.

4. The hydraulic shock absorber according to claim 2, wherein:
    a connection shaft for the sub piston penetrates the first separator and connected to a cap at a damper cylinder end portion;
    the blow hole is provided in the connection shaft;
    the oil in the bladder side oil chamber, which passes through the blow hole, escapes into a gas chamber of an outer cylinder portion through a communication path provided in the connection shaft and the cap; and
    a blow piston is provided in the communication path.

5. The hydraulic shock absorber according to claim 2, wherein the bladder has a tapered surface on a first separator side thereof; and
    wherein a blow hole is located on a second separator side.

6. The hydraulic shock absorber according to claim 1, wherein
    a vehicle body side sleeve and a wheel side tube are slidably and engagably fitted to each other,
    the damper cylinder stands upright in the vehicle body side sleeve; and
    the piston rod stands upright in the wheel side tube.

7. The hydraulic shock absorber according to claim 6, wherein the blow hole is provided in the damper cylinder and the oil in the bladder side oil chamber which passes through the blow hole is allowed to escape into a gas chamber of an outer cylinder portion.

8. The hydraulic shock absorber according to claim 6, wherein:
    a connection shaft for the sub piston penetrates the first separator and connected to a cap at a damper cylinder end portion;
    the blow hole is provided in the connection shaft;
    the oil in the bladder side oil chamber, which passes through the blow hole, escapes into a gas chamber of an outer cylinder portion through a communication path provided in the connection shaft and the cap; and
    a blow piston is provided in the communication path.

9. The hydraulic shock absorber according to claim 1, wherein:
    the bladder is formed in an annular bag-shape by an annular inner wall, an annular outer wall, and a bottom wall interconnecting the both walls;
    a connecting shaft penetrates an inside of the annular inner wall;
    the damper cylinder is located outside the annular outer wall;
    a bottom wall side end of the bladder is supported by the first separator; and
    an annular opening side end of the bladder is supported to a second separator.

10. The hydraulic shock absorber according to claim 9, wherein the bladder has a tapered surface on a first separator side thereof; and
    wherein a blow hole is located on a second separator side.

11. The hydraulic shock absorber according to claim 1, wherein the blow hole is provided in the damper cylinder and the oil in the bladder side oil chamber which passes through the blow hole is allowed to escape into a gas chamber of an outer cylinder portion.

12. The hydraulic shock absorber according to claim 1, wherein:
a connection shaft for the sub piston penetrates the first separator and connected to a cap at a damper cylinder end portion;
a blow hole is provided in the connection shaft;
the oil in the bladder side oil chamber, which passes through the blow hole, escapes into a gas chamber of an outer cylinder portion through a communication path provided in the connection shaft and the cap; and
a blow piston is provided in the communication path.

13. A hydraulic shock absorber comprising:
a damper cylinder having a hollow bore formed therein;
a piston rod provided with a piston and inserted in the bore of the damper cylinder, the piston operable to divide the bore into a rod side oil chamber and a piston side oil chamber on opposite sides of the piston;
a damping force generator provided at the piston;
a pressure side damping force generator provided in the piston side oil chamber of the damper cylinder;
the pressure side damping force generator is provided with a sub piston that is provided in the piston side oil chamber of the damper cylinder and has a damper force generating function;
a first separator is provided in a sub piston side oil chamber of the sub piston, the first separator having a communication hole that allows the sub piston side oil chamber and a bladder side oil chamber to be in communication;
a bladder, which has a gas chamber in an interior thereof and pressurizes oil, is mounted in the bladder side oil chamber; and
a blow piston which opens according to a pressure of oil entering the bladder side oil chamber and discharges the oil in the bladder side oil chamber.

14. The hydraulic shock absorber according to claim 13, wherein:
the bladder is formed in an annular bag-shape by an annular inner wall, an annular outer wall, and a bottom wall interconnecting the both walls;
a connecting shaft penetrates an inside of the annular inner wall;
the damper cylinder is located outside the annular outer wall;
a bottom wall side end of the bladder is supported by the first separator; and
an annular opening side end of the bladder is supported to a second separator.

15. The hydraulic shock absorber according to claim 13, wherein
a vehicle body side sleeve and a wheel side tube are slidably and engagably fitted to each other,
the damper cylinder stands upright in the vehicle body side sleeve; and
the piston rod stands upright in the wheel side tube.

16. The hydraulic shock absorber according to claim 13, further comprising:
a second separator, which supports the bladder and has a communication hole allowing the gas chamber of the bladder and a gas pressurization chamber to be in communication, provided in the damper cylinder, and
a bladder pressurization supply valve, which adjusts a gas pressure, provided in the gas pressurization chamber.

* * * * *